Patented June 29, 1937

2,085,183

UNITED STATES PATENT OFFICE 2,085,183

CONDENSATION PRODUCTS OF PHENOL-PHTHALEIN

Edmond H. Bucy and Robert Watkins, Waukegan, Ill., assignors, by mesne assignments, to Atlas Powder Company, North Chicago, Ill., a corporation of Delaware No Drawing. Application August 22, 1932, Serial No. 629,878

7 Claims. (Cl. 260—2)

This invention relates to condensation products of phenol-phthalein with various substances, such as organic acids, castor oil, rosin, etc., also oils, as linseed oil, China wood oil, etc.

It is well known that the synthetic resins made by the reaction between a phenol and an aldehyde, or substances developing aldehydes, have found a great use in the manufacture of varnish and lacquers even though their undesirable property of turning red or pink requires great attention and care in their manufacture. However, even with the greatest care such changes in the color cannot always be avoided and cause waste in material, time and labor.

In addition to this hardship there is the other, that cellulose ester solutions, such as that of nitro-cellulose, cellulose acetate and those of the cellulose ethers, are not compatible with various classes of resins, or solutions of the same.

Thus synthetic resins may not always be dissolved in solvents of either nitro-cellulose, or cellulose acetate; or solutions of such synthetic resins are not miscible with solutions of aforesaid cellulose derivatives. Another question to be considered is whether the synthetic resin, if it blends well with the solution of aforesaid cellulose compounds upon evaporation of the solvent, furnishes a film which, if durable, flexible and elastic enough to be acceptable, has the proper luster and gloss.

Though the present market offers various synthetic resins of substantial merit, there is inducement for research work to obtain synthetic resins which have all the desirable merits of the best synthetic resins of the present market and yet are free of the bothersome discolorations mentioned before.

We have now found out that we may obtain very desirable synthetic resins for the purpose of admixing the same to nitro-acetyl cellulose, or cellulose ethers by combining phenolphthalein with various soap forming substances selected from a group containing vegetable oils and fatty acids of vegetable as well as animal origin, containing, for instances, rosin esters, drying oils, such as linseed oil, boiled linseed oil, China wood oil, rape-seed oil, other vegetable oils, such as castor oil, olive oil, peanut oil, and other similar oils which are more or less often applied in the line of this art, and various acids, such as palmitic, stearic, linoleic, linolenic, oleic, etc., and mixtures thereof.

Our new compounds may be easily introduced into a nitro-cellulose solution, or acetyl-cellulose solution, or into solutions of cellulose ethers, such as methyl-cellulose, ethyl-cellulose, propyl-cellulose, butyl-cellulose, amyl-cellulose.

Benzyl-cellulose and acetyl-cellulose, representative of the complete series of ethers being used, our new synthetic resins, or their solutions, readily blend with the aforesaid cellulose derivatives, or their solutions so as to yield clear and tough films for moving picture purposes, or for coating surfaces of metals, wood, or of cementitious or other compositions such as used in the building trade. Our new compounds may also very suitably be used as binders in the molding of all kinds of articles from mixtures of plastic products. In the application of our new resins and the compositions made therefrom it is of course also understood that both natural gums and synthetic resins may be admixed, for instance, phenol formaldehyde condensation products, novolaks, urea-formaldehyde condensation products, resins consisting of glycerin esters, and other similar products.

For the better understanding of our invention we first wish to describe how we proceed to make the various synthetic resins, all of which contain the radical of phenolphthalein in their molecule.

I.—Process for condensing phenol-phthalein with rosin

We mix 1 lb. of rosin with 8 oz. of phenolphthalein and heat the mixture, suitably under a reflux condenser, in an oil bath up to 480° F.; after this temperature is reached we let the mixture cool down to 420° F. and keep it at this temperature until the reaction is complete, which is noted by the uniformity and clarity of the reaction products. We had cause to notice that the aforesaid temperatures are critical for the result of the process and that the heating should be carefully confined to said temperatures as otherwise the final product will assume a crystalline form instead of remaining in the amorphous state, which is preferable for various purposes. The crystalline product was found to melt at 45° C. (113° F.).

The above description applies when the reacting materials are used without modifiers or catalysts. It is possible by using such modifiers to obviate the necessity of working at such a critical temperature.

The resin thus obtained is soluble in esters, for instance, in the acetates, such as ethyl, amyl, butyl and propyl acetates, the propionates, such as butyl-propionate, the lactates, such as ethyl-lactate, cellosolve acetate, and the complete series of esters, also alcohols, such as methyl alcohol, ethyl alcohol, propyl alcohol, butyl alcohol, amyl alcohol, ketones, such as acetones, acetates, ethyl-ketone, ethyl-acetone, methyl-acetone, ethyl-methyl-ketone, camphor oil, acetone oil, and other similar solvents.

These resins are for the most part sparingly soluble in coal-tar and petroleum hydrocarbons, but are readily soluble in mixtures of such hydrocarbons when mixed with alcohol or other solvents mentioned above.

The reaction between the phenol-phthalein and the rosin proceeds without or with pressure, with a speed quite satisfactory for technical purposes. We found, however, that the speed of reaction may be remarkably accelerated by adding various accelerating agents to the mixture of the reacting substances; they may be added in an amount of approximately 10% of the phenol-phthalein content (this percentage, however, is not critical and may be varied quite widely one way or the other) to the mixture either before or after the heating has been started. We found it convenient to evenly distribute the accelerating agent through the mixture before the same is heated as this guarantees a more even effect on the molten batch. As accelerating or modifying agents we found particularly suitable p-tertiary amyl-phenol, sodium carbonate; other fairly good agents for this purpose are hydrochloric acid and sodium benzoate.

*II.—Process for condensing phenol-phthalein with castor oil*

We mix 1 lb. of castor oil and 14 oz. of phenol-phthalein in a suitable vessel, preferably in one which has a reflux condenser, in an oil bath to 460° F., let the mass cool down to 440° F. and hold the temperature at this latter point until all the phenol-phthalein has dissolved and the reaction mass has become entirely clear. In this case it is also necessary to hold the temperatures very carefully, for the temperatures are very critical for the success of the reaction and the properties of the obtained products. The process may be carried through as described under I; the product is soluble in practically the same solvents stated under I, except in straight tar and petroleum hydrocarbons. We may again add p-tertiary amyl-phenol, or sodium carbonate and other substances mentioned under I, as accelerating agents, including hydrochloric acid, sodium benzoate. The percentage is not critical and may be varied quite widely one way or the other.

The resulting condensation product is fluid at the temperature of reaction, but when the other liquids are separated from the oil-like condensation product, it solidifies to the preferable amorphous mass and only when the temperature limits, set forth above, were not well kept, will the final product show a crystalline structure. This resin melts at 82° C. (180° F.).

We have extended our research on suitable synthetic resins and have obtained remarkable results with some other combinations, which are tabulated below with the melting point of the obtained product:

Melting point
III.—Phenol-phthalein, castor oil and rosin _____ 87° C.
IV.—Phenol-phthalein, China-wood oil and rosin _____ 90° C.
V.—Phenol-phthalein and linseed oil ___ 78° C.
VI.—Phenol-phthalein, linseed oil and rosin _____ 85° C.
VII.—Phenol-phthalein, castor oil and rosin ester _____ 88° C.

We may also in the cases III to VII apply with success accelerating agents, such as p-tertiary amyl-phenol, or sodium carbonate.

All the mixtures mentioned above were treated as described above under I and the amorphous condensation products obtained thereby are soluble in practically all the organic solvents usually applied in the manufacture of varnishes and lacquers except that the products obtained under III to VII are insoluble in straight coal-tar and hydrocarbons.

The condensation products of phenol-phthalein with the various substances referred to in the cases I to VII, are all compatible with nitro cellulose, or acetyl cellulose, or cellulose ethers, for the resins thus obtained dissolve entirely in solutions of aforesaid cellulose derivatives and the films obtained with them are absolutely clear and transparent; also their mechanical strength is highly satisfactory, the film being strong and tough and highly resistant to tearing.

The adaptability of our new condensation products is shown by the following examples, illustrating the application of the new condensation products for lacquer compositions containing nitro-cellulose, acetyl-cellulose, cellulose ethyl-ether.

A. *Nitro-cellulose lacquer—*

| | Pounds |
|---|---|
| 3 lb. cut of resin | 4 |
| Butyl alcohol | ½ |
| Butyl acetate | ½ |
| Cellosolve acetate | ½ |
| Ethyl-cellosolve | ½ |
| Lacquer thinner | 5 |
| 20″–30″ nitro-cellulose cut | 5 |

B. *Cellulose acetate lacquer—*

| | Pounds |
|---|---|
| 3 lb. cut of resin in ethyl lactate | 4 |
| Acetone | ½ |
| Ethylene dichloride | ½ |
| Completely denatured alcohol | ½ |
| ½″ cellulose acetate sol | 5 |

C. *Lacquer containing cellulose ethylether—*

| | Pounds |
|---|---|
| 4 lb. cut of resin | 3 |
| Completely denatured alcohol | ½ |
| Toluol | ½ |
| ½″ ethylether cellulose cut | 5 |

Plasticizing agents may be added to aforesaid lacquers as well as to films, such as obtained from any solution of such a condensation product with a nitro or acetyl cellulose solution or with a cellulose ether, such as cellulose ethylether.

Upon drying any of the aforesaid lacquers on a glass plate under special conditions, the films obtained may be easily stripped off and are absolutely clear and transparent so that their suitability for photographic purposes is well established. As to their mechanical solidity we may say that they are very hard and tough; they cannot be scratched by passing a finger nail over them.

For making molded articles from the synthetic resins, obtained as described above, either by these resins as such or in admixture with any of the many fillers as applied in the molding art, for instance, asbestos, wood flour, silica-earth, our new synthetic resins are very well suitable as they are melting below 100° C. and thus can very conveniently be caused to melt by simply heating the mold with steam in the way known to the art.

What we claim is:

1. A synthetic resin, comprising a condensation product of phenol-phthalein and castor oil, the said product melting substantially at 82° C.

2. A synthetic resin, comprising a condensation product of phenol-phthalein, castor oil and rosin ester, the said product melting substantially at 88° C.

3. The process of making a resinous material comprising the condensation product of phenol-phthalein and castor oil which comprises heating together phenol-phthalein and castor oil in the presence of an agent selected from the group consisting of sodium carbonate, sodium benzoate, p-tertiary amylphenol and hydrochloric acid.

4. The process of making a resinous material comprising the condensation product of phenol-phthalein, castor oil and rosin ester which comprises heating together phenol-phthalein, castor oil and rosin ester in the presence of an agent selected from the group consisting of sodium carbonate, sodium benzoate, p-tertiary amylphenol and hydrochloric acid.

5. The process of making a resinous material comprising the condensation product of phenol-phthalein and castor oil which comprises heating together phenol-phthalein and castor oil in the presence of p-tertiary amylphenol.

6. The process of making a resinous material comprising the condensation product of phenol-phthalein, castor oil and rosin ester which comprises heating together phenol-phthalein, castor oil and rosin ester in the presence of p-tertiary amylphenol.

7. The process of making an amorphous condensation product of phenol-phthalein and castor oil which comprises heating a mixture of phenol-phthalein and castor oil to a temperature in the neighborhood of 460° F., cooling the mixture to a temperature in the neighborhood of 440° F., and maintaining the temperature in the neighborhood of 440° F. until the reaction mass has become entirely clear.

ED. H. BUCY.
ROBERT WATKINS.